United States Patent
Theodoulou et al.

(10) Patent No.: US 10,266,423 B2
(45) Date of Patent: Apr. 23, 2019

(54) AMMONIA STRIPPER

(71) Applicant: ANAERGIA INC., Burlington (CA)

(72) Inventors: Michael David Theodoulou, Milton (CA); Sasha Rollings-Scattergood, Fergus (CA); Arman Ghandizadehdezfuli, North York (CA)

(73) Assignee: ANAERGIA INC., Burlington (CA)

( * ) Notice: Subject to any disclaimer, the term of this patent is extended or adjusted under 35 U.S.C. 154(b) by 159 days.

(21) Appl. No.: 14/934,780

(22) Filed: Nov. 6, 2015

(65) Prior Publication Data

US 2016/0130158 A1      May 12, 2016

Related U.S. Application Data

(60) Provisional application No. 62/076,784, filed on Nov. 7, 2014.

(51) Int. Cl.
| | |
|---|---|
| *C02F 1/20* | (2006.01) |
| *C02F 1/02* | (2006.01) |
| *B01D 19/00* | (2006.01) |
| *C02F 101/16* | (2006.01) |
| *C02F 3/28* | (2006.01) |

(52) U.S. Cl.
CPC ............ *C02F 1/20* (2013.01); *B01D 19/0015* (2013.01); *C02F 1/02* (2013.01); *C02F 3/28* (2013.01); *C02F 2101/16* (2013.01); *C02F 2201/002* (2013.01)

(58) Field of Classification Search
CPC .......... B01D 19/0015; C02F 1/02; C02F 1/20; C02F 2101/16; C02F 2201/002; C02F 3/28

USPC ...................... 261/127, 153, 122.1, 124, 125
See application file for complete search history.

(56) References Cited

U.S. PATENT DOCUMENTS

| | | | | |
|---|---|---|---|---|
| 1,014,893 | A | * | 1/1912 | Moeller ............. B01F 3/04808 165/96 |
| 1,328,259 | A | * | 1/1920 | Barbet ..................... B01D 3/18 261/114.5 |

(Continued)

FOREIGN PATENT DOCUMENTS

| CA | 2343832 A1 | 10/2002 |
|---|---|---|
| CA | 2381623 A1 | 10/2002 |

(Continued)

OTHER PUBLICATIONS

Ammonia Recovery Process, http://www.thermoenergy.com/water-technologies/, retrieved on line 2011, 1 page.

(Continued)

*Primary Examiner* — Charles S Bushey

(57) ABSTRACT

An ammonia stripper has an aerator and heat exchanger tubing in a tank. The aerator and coil are preferably attached to a frame to form a removable cassette. The cassette may also include a lid for the tank. The tank is preferably rectangular and optionally can be made with the dimensions of a standard shipping container. In a process, water flows through the tank while air bubbles are produced through the aerator. A heating medium such as water flows through the heat exchanger tubing. A gas containing ammonia is withdrawn from a headspace of the tank.

10 Claims, 3 Drawing Sheets

(56) References Cited

U.S. PATENT DOCUMENTS

| | | | |
|---|---|---|---|
| 2,000,444 A * | 5/1935 | Hechenbleikner ... | B01D 47/021 261/122.1 |
| 2,289,953 A * | 7/1942 | Aldridge ................... | C10C 3/04 165/108 |
| 2,854,827 A * | 10/1958 | Lockerbie ............. | F25D 31/002 261/124 |
| 2,937,506 A * | 5/1960 | Stirlen ................... | B64D 13/08 261/122.1 |
| 3,255,887 A | 6/1966 | Walker et al. | |
| 3,365,860 A * | 1/1968 | Boris .................. | B01F 3/04517 261/122.1 |
| 3,517,732 A | 6/1970 | Robert | |
| 3,618,905 A * | 11/1971 | Primus ................. | B67D 1/0036 261/121.1 |
| 3,864,440 A * | 2/1975 | Giocoechea .......... | A61M 16/16 128/200.13 |
| 4,098,690 A | 7/1978 | Semmens | |
| 4,162,147 A | 7/1979 | Haverkamp | |
| 4,198,359 A * | 4/1980 | Todd ................... | B01F 3/04262 210/220 |
| 4,294,812 A | 10/1981 | Oler | |
| 4,414,103 A | 11/1983 | Farrell | |
| 4,477,341 A * | 10/1984 | Schweiss ............. | B03D 1/1406 209/170 |
| 4,613,431 A * | 9/1986 | Miller .................. | B03D 1/1418 209/169 |
| 4,618,462 A * | 10/1986 | Fisher ....................... | F24F 6/00 236/44 C |
| 4,770,748 A | 9/1988 | Cellini et al. | |
| 4,861,524 A * | 8/1989 | Sielaff ............... | C03B 37/01413 261/121.1 |
| 4,880,504 A | 11/1989 | Cellini et al. | |
| 5,030,362 A | 7/1991 | Da et al. | |
| 5,273,572 A | 12/1993 | Baker et al. | |
| 5,458,789 A | 10/1995 | Dickerson et al. | |
| 5,593,590 A | 1/1997 | Steyskal | |
| 5,863,444 A | 1/1999 | Murphy et al. | |
| 6,149,887 A | 11/2000 | Lagas et al. | |
| 6,162,284 A | 12/2000 | Mitchell et al. | |
| 6,299,774 B1 | 10/2001 | Ainsworth et al. | |
| 6,368,849 B1 | 4/2002 | Norddahl | |
| 6,383,544 B1 | 5/2002 | Elkins | |
| 6,409,788 B1 | 6/2002 | Sower | |
| 6,464,875 B1 | 10/2002 | Woodruff | |
| 6,569,332 B2 | 5/2003 | Ainsworth et al. | |
| 6,682,578 B2 | 1/2004 | Sower | |
| 6,692,642 B2 | 2/2004 | Josse et al. | |
| 6,715,743 B2 * | 4/2004 | Zhang ................ | H01M 8/04126 261/122.1 |
| 6,838,069 B2 | 1/2005 | Blonigen et al. | |
| 6,846,343 B2 | 1/2005 | Sower | |
| 6,866,779 B1 | 3/2005 | Burke | |
| 6,916,426 B2 | 7/2005 | Van et al. | |
| 6,920,983 B2 * | 7/2005 | Gabl ....................... | D21B 1/327 162/4 |
| 6,984,323 B2 | 1/2006 | Khudenko | |
| 7,014,768 B2 | 3/2006 | Li et al. | |
| 7,153,427 B2 | 12/2006 | Burke | |
| 7,204,967 B2 | 4/2007 | Bierle et al. | |
| 7,416,644 B2 | 8/2008 | Bonde | |
| 7,731,850 B2 | 6/2010 | Choi et al. | |
| 7,806,957 B1 | 10/2010 | Burke | |
| 7,927,491 B2 | 4/2011 | Kotelko et al. | |
| 8,470,567 B2 | 6/2013 | Facey et al. | |
| 9,045,355 B2 | 6/2015 | Kumar et al. | |
| 2001/0004063 A1 | 6/2001 | Oh | |
| 2001/0033816 A1 | 10/2001 | Blonigen et al. | |
| 2003/0084693 A1 | 5/2003 | Sower | |
| 2003/0201225 A1 | 10/2003 | Josse et al. | |
| 2005/0047995 A1 | 3/2005 | Wylie | |
| 2005/0139546 A1 | 6/2005 | Burke | |
| 2006/0006055 A1 | 1/2006 | Bonde | |
| 2007/0048212 A1 | 3/2007 | Bierle et al. | |
| 2007/0141691 A1 | 6/2007 | Hirl | |
| 2007/0297953 A1 | 12/2007 | Kemp et al. | |
| 2008/0053909 A1 | 3/2008 | Fassbender | |
| 2008/0053913 A1 | 3/2008 | Fassbender | |
| 2008/0152571 A1 | 6/2008 | Hu et al. | |
| 2008/0156709 A1 | 7/2008 | Johnson | |
| 2008/0156726 A1 | 7/2008 | Fassbender | |
| 2008/0302722 A1 | 12/2008 | Burke | |
| 2009/0014377 A1 | 1/2009 | Janssen et al. | |
| 2009/0206028 A1 | 8/2009 | Jiang et al. | |
| 2010/0065250 A1 | 3/2010 | Frommann | |
| 2010/0170845 A1 | 7/2010 | Baur et al. | |
| 2010/0187182 A1 | 7/2010 | Vago | |
| 2010/0218573 A1 | 9/2010 | Van | |
| 2011/0091954 A1 | 4/2011 | Chen et al. | |
| 2014/0033776 A1 | 2/2014 | Josse et al. | |
| 2014/0144195 A1 | 5/2014 | Callendrello et al. | |
| 2014/0157846 A1 | 6/2014 | Jeppson et al. | |
| 2014/0314657 A1 * | 10/2014 | Zhao ....................... | C05F 5/008 423/545 |
| 2017/0334739 A1 * | 11/2017 | Theodoulou .............. | C02F 1/20 |

FOREIGN PATENT DOCUMENTS

| | | |
|---|---|---|
| CA | 2416690 A1 | 7/2004 |
| CA | 2416690 C | 8/2008 |
| CA | 2799408 A1 | 11/2011 |
| DE | 2726233 A1 | 12/1978 |
| DE | 4444032 C1 | 5/1996 |
| EP | 0494154 B1 | 9/1995 |
| GB | 2139610 A | 11/1984 |
| GB | 2383034 A | 6/2003 |
| WO | 9942423 A1 | 8/1999 |
| WO | 2010096899 A1 | 9/2010 |
| WO | 2011156767 A2 | 12/2011 |
| WO | 2012109737 A1 | 8/2012 |
| WO | 2013091094 A1 | 6/2013 |
| WO | 2014094162 A1 | 6/2014 |

OTHER PUBLICATIONS

Bonmati et al., "Air Stripping of Ammonia From Pig Slurry: Characterisation and Feasibility as a Pre—or Post-Treatment to Mesophilic Anaerobic Digestion", Waste Management, 2003, vol. 23 (3), pp. 261-272.

Cast Systems, www.thermoenergy.com/water-technologies/technologies . . . , 2011, retrieved from the Internet Nov. 2, 2011, 1 Page.

CASTion Corporation, A Thermo Energy Company, "Ammonia Removal in Municipal Sludge Dewatering Centrate", Pilot Test Results on Centrate, Dec. 1, 2008, 16 Pages.

Constantine, "An Overview of Ammonia and Nitrogen Removal in Wastewater Treatment", CH2M Hill Canada, Feb. 19, 2008.

Constantine, "North American Experience with Centrate Treatment Technologies for Ammonia and Nitrogen Removal", WEFTEC Conference, 2006, pp. 5271-5281.

Dhaliwal et al., "Distillation of Ammonia from Water and Wastewater", Water Pollution Control Federation, Oct. 1985, vol. 57 (10), pp. 1036-1039.

EPA, "Wastewater Technology Fact Sheet Ammonia Stripping", United States Environmental Protection Agency, Sep. 2000, 4 pages.

European Application No. 12860692, Supplementary European Search Report dated Jul. 16, 2015.

European Application No. 13866334.9, Supplementary Partial European Search Report dated Oct. 21, 2016.

European Patent Application No. 12860692.8, Office Action dated Dec. 12, 2016.

Fernandez-Seara et al., "Distillation Column Configurations in Ammonia-Water Absorption Refrigeration Systems", International Journal of Refrigeration, Jan. 2003, vol. 26 (1), pp. 28-34.

Groth et al., English Language Abstract of DE4444032 entitled "Manure treatment in two stages, to release ammonia and concentrate slurry", published May 2, 1996, 1 page.

International Patent Application No. PCT/CA2012/000144, International Preliminary Report on Patentability dated Aug. 29, 2013.

(56) References Cited

OTHER PUBLICATIONS

International Patent Application No. PCT/CA2012/000144, International Search Report dated Jul. 10, 2012.
International Patent Application No. PCT/CA2012/050907, International Preliminary Report on Patentability dated Jul. 3, 2014.
International Patent Application No. PCT/CA2012/050907, International Search Report dated Mar. 25, 2013.
International Patent Application No. PCT/CA2013/050985, International Preliminary Report on Patentability dated Jul. 2, 2015.
International Patent Application No. PCT/CA2013/050985, International Search Report and Written Opinion dated Apr. 24, 2014.
International Patent Application No. PCT/CA2015/051154, International Search Report and Written Opinion dated Jan. 25, 2016.
Jorgensen et al., "Ammonia Removal from Wastewater by Ion Exchange in the Presence of Organic Contaminants", Water Research, 2003, vol. 37, pp. 1723-1728.
OILGAE, "New Technologies in Ammonia Removal from Wastewater", http://www.oilge.com/algae/cult/sew/new/amm/amm.html, retrieved online Dec. 14, 2011, 10 Pages.
Orentlicher, et al., "Savings from Integration of Centrate Ammonia Reduction with BNR Operation: Simulation of Plant Operation," ThermoEnergy Corporation, HydroQual Inc., 2009 International Conference on Nutrient Recovery from Wastewater Streams, 2009, http://web2.uconn.edu/seagrantnybight/documents/nutrient%20docs/Orentlicher%20Savings%20Integration%20Centrate%20Ammonia%20Reduction.pdf, 25 pages.
Thermoenergy, Ammonia Removal and Recovery Systems for Industrial Wastewater Treatment, http://www.thermoenergy.com/water-technologies/industrial-solutions/ammonia-removal . . . , retrieved online Dec. 14, 2011, 2 Pages.
U.S. Appl. No. 13/823,404, Final Office Action dated Feb. 9, 2016.
U.S. Appl. No. 13/823,404, Office Action dated Feb. 13, 2015.
U.S. Appl. No. 13/823,404, Office Action dated May 21, 2015.
U.S. Appl. No. 13/982,585, Office Action dated Dec. 14, 2015.
U.S. Appl. No. 13/982,585, Office Action dated Sep. 18, 2015.
U.S. Appl. No. 14/652,615, Office Action dated Feb. 10, 2017.
Written Opinion for Application No. PCT/CA2012/000144, dated Jul. 10, 2012, 5 pages.
Written Opinion for Application No. PCT/CA2012/050907, dated Mar. 25, 2013, 10 pages.
Canadian Patent Application No. 2,826,025, Office Action dated Oct. 16, 2017.
European Application No. 13866334.9, Supplementary Partial European Search Report dated Feb. 20, 2017.
European Patent Application No. 12746463.4 Communication pursuant to Rule 70(2) and 70a(2) EPC dated Jul. 7, 2017.
European Patent Application No. 12746463.4, Extended European Search Report dated Jun. 21, 2017.
European Patent Application No. 12860692.8, Office Action dated Jan. 4, 2018.
European Patent Application No. 12860692.8, Office Action dated Jan. 16, 2018.
U.S. Appl. No. 14/652,615, Final Office Action dated Jun. 7, 2017.
U.S. Appl. No. 14/652,615, Notice of Allowance dated Jul. 21, 2017.
U.S. Appl. No. 15/209,293, Non-Final Office Action dated May 14, 2018.
U.S. Appl. No. 15/209,293, Restriction Requirement dated Feb. 16, 2018.
U.S. Appl. No. 15/360,574, Non-Final Office Action dated Feb. 8, 2018.
European Patent Application No. 15857098.6, Extended European Search Report dated Jun. 6, 2018.

\* cited by examiner

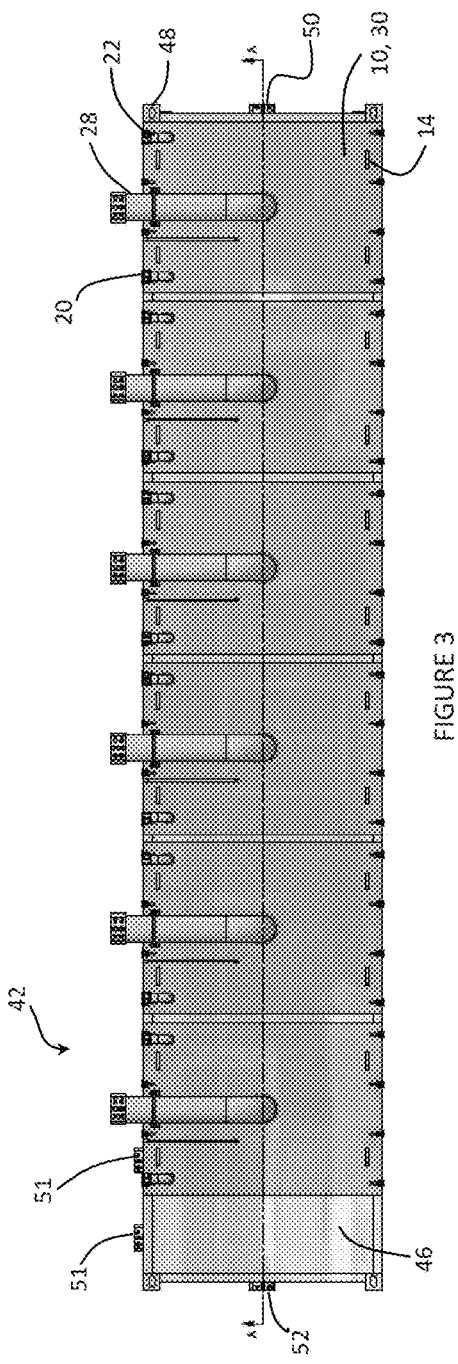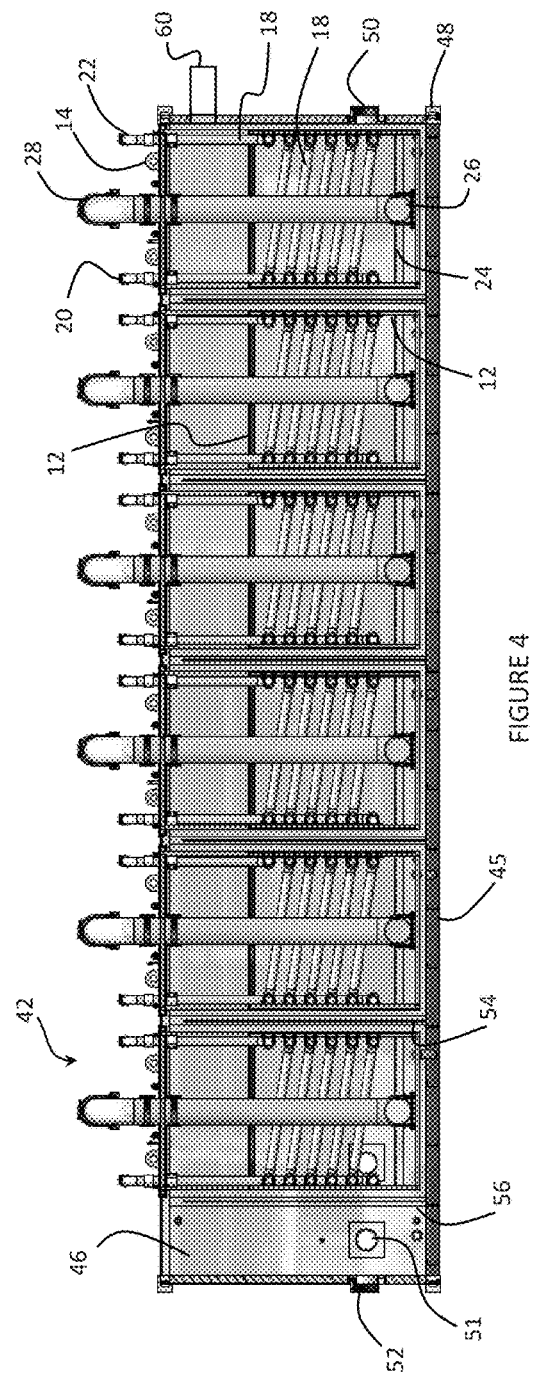

AMMONIA STRIPPER

CROSS-REFERENCES TO RELATED APPLICATIONS

This application claims the benefit of priority from U.S. Provisional Application No. 62/076,784 filed on Nov. 7, 2014. U.S. Provisional Application No. 62/076,784 is incorporated by reference.

FIELD

This patent relates to separating ammonia from water.

BACKGROUND

International Publication Number WO 2013/091094, Organics and Nutrient Recovery from Anaerobic Digester Residues, describes a system in which sludge from an anaerobic digester is treated to recover nutrients. Ammonia in a liquid fraction of the sludge is recovered and used to produce a concentrated acidic ammonium salt solution. This solution may be mixed with a solid fraction of the sludge to produce a nitrogen-enriched solid. Various methods and devices for stripping ammonia are described. In one example, an ammonia stripper has a set of cylindrical reactors arranged for liquid to flow through them in series. Each reactor has a jacket around its outer walls. Hot water flows through the jackets to heat the liquid. A diffuser at the bottom of the reactor introduces air bubbles into the liquid. Gas including ammonia collects in the headspace of each reactor and is removed by connecting a gas outlet to the suction side of a pump.

INTRODUCTION

This specification describes an apparatus and process that can be used for stripping ammonia from an aqueous solution or mixture.

An ammonia stripper described in this specification has an aerator and a heat exchanger tube inside of a tank. Optionally, a large tank can be broken into cells by one or more internal dividers. In a process, water flows through the tank while air bubbles are produced through the aerator. A heating medium such as water flows through the heat exchanger tube. A gas containing ammonia is withdrawn from a headspace of the tank.

This specification also describes a cassette having a heat exchanger tube and an aerator attached to a frame. In use, the cassette is fitted to a tank such that the aerator and heat exchanger tube are immersed in water in the tank. Optionally, the cassette may also have a lid that covers at least part of the tank, and is supported by the tank, when the cassette is installed. The frame may be suspended from the lid. In another option, there may have one or more latches on the lid or the tank for connecting the lid to the tank. In another option, the cassette may have one or more lift fittings to allow a crane, hoist or other overhead lifter to install or remove the cassette.

In one example, an ammonia stripper has a tank that is rectangular and has the dimensions of a standardized shipping container, for example an ISO container. The tank has internal dividers that create a plurality of cells. Each cell has an aerator and heat exchanger tube. The aerator and heat exchanger tube in a cell are preferably parts of a cassette as described above. The ammonia stripper can be transported by any vehicle, or crane etc., that is configured to accept a shipping container.

BRIEF DESCRIPTION OF THE FIGURES

FIG. 3 is a cross section of the ammonia stripper of FIG. 2.

FIG. 4 is a top view of the ammonia stripper of FIG. 2

DETAILED DESCRIPTION

Figure 1:
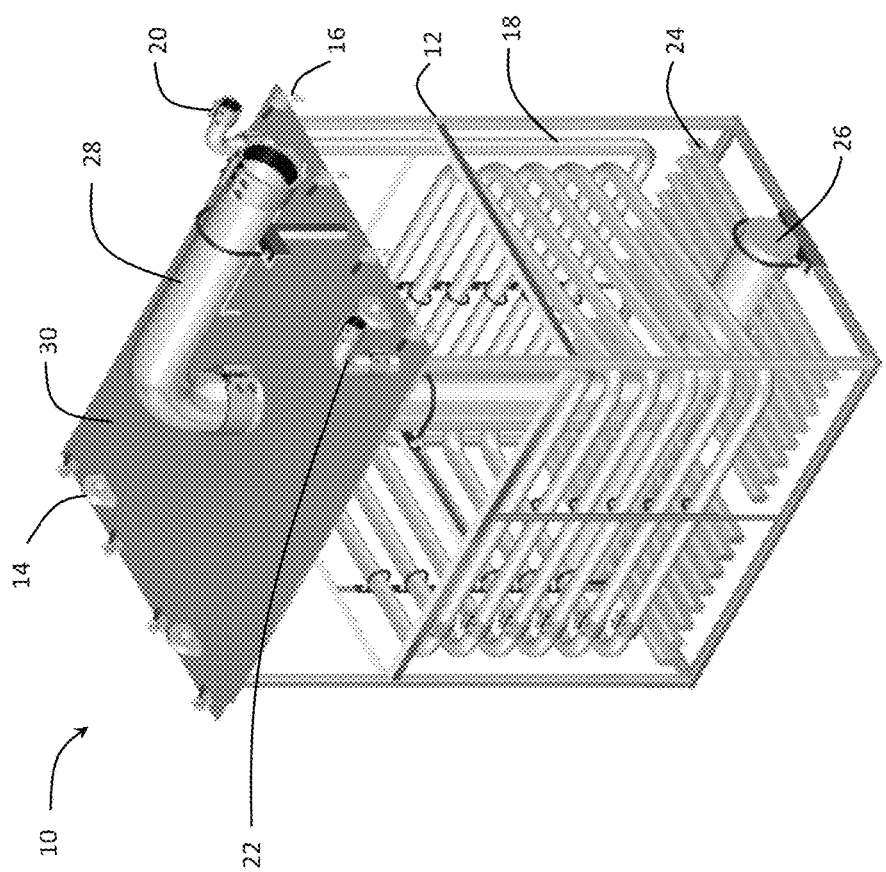
FIG. 1 is an isometric view of a cassette for an ammonia stripper.

An ammonia stripper may alternatively be called an ammonia stripping unit or an ammonia separation unit. An ammonia stripper as described in this specification uses heat and subsurface aeration to remove ammonia from water. The water may be in the form of an aqueous solution or mixture. For example, the water may be the liquid fraction (for example a filtrate or centrate) produced by dewatering the sludge from an anaerobic digester.

The water being stripped is contained in a vessel, for example a tank. The vessel is generally enclosed in that the vessel defines a headspace that can be connected to an outlet port. However, the vessel is preferably not entirely sealed since that is unnecessary and would complicate the construction of the vessel and liquid flow through the vessel. In use, the headspace can be connected to the suction side of a pump to evacuate a gas containing ammonia. This puts the headspace under a partial vacuum, which inhibits ammonia emissions even if the vessel is not entirely sealed.

At least one aerator in the tank provides subsurface aeration. The aerator may alternatively be called a sparger or diffuser. In a large tank, there may be many aerators dispersed across the bottom of the tank. The one or more aerators may be medium bubble aerators. The one or more aerators are connected to a blower, which provides the subsurface air. In cold climates the subsurface air can be heated prior to entering the stripper using a gas to liquid heat exchanger, for example with heat provided by liquid effluent from the ammonia stripper. In another option, the subsurface air can be heated in a gas to gas heat exchanger with heat provided by exhaust from an engine or boiler burning biogas produced by an anaerobic digester that provides the feed water to the ammonia stripper.

The ammonia stripper operates at above ambient temperature, for example 50 degrees C. or more, or about 70 degrees C. or more. The ammonia stripper is heated by recirculating a heating fluid, for example water, through a heat exchanger tube in the tank. The heat exchanger tube is a tube bent, folded, coiled or otherwise configured to provide a length greater than the perimeter of the tank inside the tank.

Optionally, when the ammonia stripper is used in combination with an anaerobic digester, the heating fluid can be heated by biogas or by waste heat produced by a generator or boiler burning the biogas. In another option, liquid effluent from the ammonia stripper may be used as the heating fluid. In this case, the effluent passes through a heat exchanger or other heater outside of the tank and then through the heat exchanger tube in the tank before leaving the ammonia stripper.

Waste heat in the effluent, whether used as the heating fluid or not, can be recovered in some cases by a heat pump or by heat exchange with another solid or fluid. For example, an anaerobic digester operating under thermophilic or mesophilic conditions may require its feed stream or a recirculating side stream to be heated, or solids in the digestate may need to be heated for drying or to drive additional ammonia gas from them. Some of the effluent from the ammonia stripper can be fed to the anaerobic digester, directly or mixed with a feed stream, as dilution water, which also carries heat to the digester. In another option, waste heat in the liquid effluent from the ammonia stripper can be used to heat ambient air flowing to a subsurface aerator in the ammonia stripper.

The ammonia stripper preferably operates with multiple cells, for example 3 to 6 cells. The cells may alternatively be called stages. Each cell may be located in a separate tank. Alternatively, walls or baffles can define cells within a tank. A tank with multiple cells is typically less expensive to construct than multiple separate tanks. Flow between cells can be provided by perforations in the walls or baffles or by other means such as a weir. Flow between the stages is preferably driven by gravity but could be pumped. Water is fed into a first cell and flows through the cells generally in series to an outlet from the last cell. However, there can be some back mixing resulting in a flow pattern that is intermediate between continuously stirred and plug flow reactor conditions. One or more aerators are placed in each cell.

In a gravity flow arrangement, the outlet from the last cell can be used to control the level of the water in the ammonia stripper. This control may be passive, for example by providing an overflow weir at a predetermined elevation. Alternatively, the water level may be controlled more actively, for example by using a weir with a movable gate or by using a swinging or telescoping tube with a variable height outlet.

The effluent from the last stage may flow into a buffer tank to de-aereate the effluent or to provide a flow buffering volume. The buffer tank may be configured as another cell within a tank containing the ammonia stripping cells. De-aerating the effluent is typically necessary before it can be pumped. Optionally, mechanical de-aeration can be used in place of or to supplement de-aeration in the buffer tank.

The ammonia stripper is preferably used to remove ammonia without adding chemicals to increase the pH of the water. The subsurface aeration first drives carbon dioxide out of the liquid. When used to treat the liquid fraction of sludge from an anaerobic digester, carbon dioxide is released from ammonium bicarbonate in the water. The ammonium bicarbonate is created in the digestion process and is in equilibrium with the carbon dioxide content of the biogas in the digester headspace, which may about 30 to 45% carbon dioxide. Stripping carbon dioxide raises the pH of the water to 9.2 or higher. When heated at elevated pH, the majority of the ammonia in the water becomes unionized ammonia gas, which is then driven out of solution and into the stripper headspace by the subsurface diffused air. Heating the ammonia stripper also helps prevent phosphate salts in the feed liquid from settling as the pH rises. Cooling the liquid effluent after it exits the ammonia stripper allows these salts to be precipitated in a controlled location such as a storage tank.

Optionally, there can be an air inlet to the headspace of the tank. As headspace gasses are removed, a crossflow of air is created through the headspace of the tank, above the surface of the liquid. The crossflow reduces the concentration of carbon dioxide in the headspace. The crossflow also reduces the ammonia concentration in the headspace at the interface between water and air. Diluting the headspace with cross flow air facilitates ammonia removal due to the higher concentration gradient of ammonia between the liquid and the air above it. Some dilution air may be provided by the lack of a perfect seal around the headspace of the tank. Adding a further air inlet to the headspace is optional since, although the rate of ammonia removal is increased, the gas removed from the headspace is diluted with air and has a lower concentration of ammonia gas. Crossflow, if any, may be at 15 to 45% of the total (cross flow and subsurface air flow) gas flow through the ammonia stripper.

Gasses in the headspace are removed with a pump, for example by negative pressure created by an induced draft fan or other blower connected to the headspace. Optionally, the outlet end of the blower may be connected directly to a downstream ammonia acid scrubber.

The liquid effluent from the ammonia stripper has reduced total nitrogen content. This effluent may be disposed of or re-used optionally after further treatment. For example, an anaerobic digester in an agricultural setting that receives high nitrogen feed such as manure may require low nitrogen dilution water. When an anaerobic digester is used to treat primary or activated sludge from a wastewater treatment plant, a liquid fraction of the digester sludge is typically returned to the wastewater treatment plant. Removing ammonia from this liquid before it returns to the wastewater treatment plant reduces the denitrification load on the wastewater treatment plant as well as recovering nitrogen in a usable form.

Ammonia rich air is withdrawn from the headspace of the ammonia stripper. To recover the ammonia (and total nitrogen) in a useful form, the ammonia rich air can be sent to an ammonia scrubber. In one example, an ammonia acid scrubber uses a counter flow column configuration with ammonia rich air circulating from the bottom up through a packed bed. The packed bed may have a plastic media to enhance gas/liquid mass transfer surface area. A liquid shower flows from the top down and reacts with the ammonia gas in the air stream. For example, a sulfuric acid shower can be used to form ammonium sulfate. Ammonium sulfate is stored in a sump at the bottom of the scrubber column. Ammonium sulfate is pumped from the sump for recirculation to the column. Sulfuric acid is added, for example to the sump or in the recirculating stream. Sulfuric acid addition can be controlled automatically based on a pH set point. Excess sulfuric acid can be added to the recirculation stream or to a product ammonium sulfate stream to produce an acidic ammonium sulfate solution, which reduces ammonia volatilization if the ammonium sulfate will be dried before use. The acid scrubber may produce about 30% ammonium sulfate solution when no excess sulfuric acid is dosed. Optionally, this solution may be concentrated before it is used. Alternatively, water without acid can be recirculated through the column to form ammonium hydroxide for use in place of ammonium sulfate. Ammonium sulfate or ammonium hydroxide can be used, for example, in liquid form as a fertilizer applied to land, as a liquid added to compost to increase its nitrogen content, or in a dry form as part of a solid fertilizer.

The ammonia stripper may have a cassette based, or cassette and tank based, construction. The cassette has a frame with a heat exchanger tube and aerator attached to the frame. There may also be a lid for a tank attached to the frame. For example, the frame may be suspended from the lid. The lid may have one or more latches for attaching the lid to the tank. There may also be one or more lift fittings attached to the lid, or to the frame. The lift fittings allow the cassette to be lifted by, for example, a crane, boom truck, or hoist.

The cassette is used with a tank large enough to contain the aerator, at least part of the heat exchanger tube, and at least part of the frame. Preferably, the cassette is designed to be compatible with a particular tank. For example, the lid can be sized to cover at least part of the tank. Alternatively or additionally, the lid can be designed so that the lid is supported by the tank. For example, the lid can rest on the walls of the tank or on fittings attached to the tank. Assembling the ammonia stripper involves lowering the frame of the cassette into the tank until the lid bears on the tank. Optionally, latches on the tank or lid can be used to secure the lid to the tank.

An ammonia stripper may have a tank that is rectangular and has the dimensions of a standardized shipping container. One or more internal dividers create multiple cells in the tank. An aerator and a heat exchanger tube are placed in the tank, preferably in each cell. The aerators and heat exchangers can be provided by adding a cassette as described above to each cell.

Whether the tank is in the shape of a shipping container or not, a tank can contain multiple cassettes with internal walls between the cassettes. The walls can be placed between each pair of cassettes or in other arrangements. The walls help to provide more nearly plug flow conditions through the tank. A wall can also be used to provide a de-aeration cell or buffer tank after the last cassette.

The ammonia stripper can be used to remove ammonia from a liquid fraction of anaerobic digester sludge. The ammonia can be used to produce an ammonium salt solution. For example, the ammonia stripper can be used in a nutrient recovery system as described in International Publication Number WO 2013/091094, which is incorporated by reference.

Figure 2:
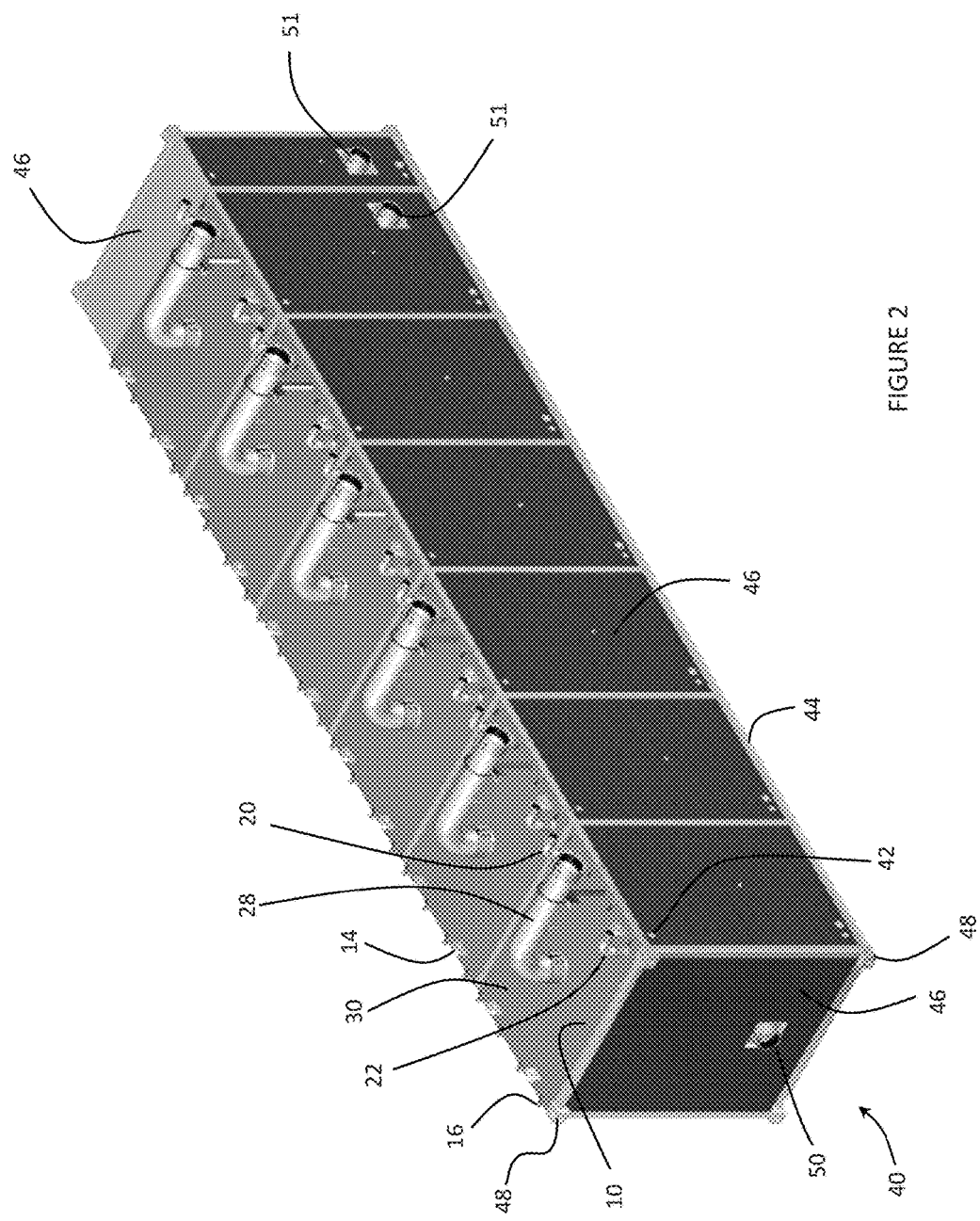
FIG. 2 is an isometric view of a six-cell ammonia stripper including the cassette of FIG. 1.

In one example, the design of a very large ammonia stripper required 15 jacketed reactors as described in International Publication Number WO 2013/091094. Replacing the jacketed reactors with a cassette-based design as shown in FIGS. 1 to 3 reduced the expected capital cost by 40%. The reduction in cost results partially from a reduction in materials and partially because it is easier to assemble the heat exchanger tubes and attach them to a frame than to make a heating jacket around a tank. The cassette-based design is also expected to be easier to maintain than a jacketed reactor since the cassettes can be removed for maintenance.

FIG. 1 shows an example of a cassette 10. The cassette 10 has a frame 12 suspended from a lid 30. The lid 30 has a set of lift fittings 14 that can be attached to a chain or cable from a crane, hoist or other similar device. The cassette 10 also has a heat exchanger tube 18 attached to the frame 12. The heat exchanger tube 18 has a number of bends, for example to produce the coiled shape shown. The ends of the heat exchanger tube 18 are connected to or provide an inlet 20 and an outlet 22. The cassette 10 also has at least one aerator 24. The aerator 24 is attached to the frame 12, preferably near the bottom of the frame 12. In the example shown in FIG. 1, several aerators 24 are attached to the frame 12 though a manifold 26. The manifold 26 is in turn connected to an air feed pipe 28.

FIGS. 2 to 4 show a tank 40 divided into a set of cells 42. The tank is constructed of walls 46 connected to a tank frame 44 extending upwards from a floor 45. The tank frame 40 is preferably sized and fitted with fittings 48 according to the standards for a standardized shipping container. Each cell 42 has a cassette 10. The lid 30 of each cassette 10 has a set of latches 16 that can be used to secure the lid 30 to a cell 42. The lid 30 is latched to the walls of the tank 40 and provides a cover for the cell 42. A tank inlet 50 communicates with a cell 42 on one end of the tank 40. An optional buffer tank 46 is provided at the other end of the tank 46. The buffer tank 46 is provided with a tank outlet 52. The buffer tank 46 and the last cell 42 also have transfer ports 51 which may be fluidly connected together.

FIG. 3 shows the interior of the tank 40. Interior walls 54 connected to the frame 44 separate the cells 42 from each other. The interior walls 54 are perforated with one or more openings. In one example, there is an opening at the base of the wall and also additional openings higher in the wall. The liquid being stripped flows into the first cell 42 through the tank inlet 50. The liquid then flows between cells 42 through the openings in the interior walls 54. An opening near the base of the interior walls 54 can also be used to allow liquid to flow between the cells 42 when the tank 40 is filled or drained for maintenance.

A buffer tank wall 56 separates the last cell 42 from the buffer tank 46. The buffer tank wall 56 does not have openings. A telescoping valve (not shown) connected between the transfer ports 51 provides flow between the last cell 42 and the buffer tank 46 while controlling the liquid level in the system cells 42. Treated liquid collects in the buffer tank 46 and may at least partially de-aerate before being drained out through the tank drain 52. The buffer tank 46 is not heated and does not have an aerator.

Ammonia rich gas is withdrawn through gas outlet 60. Optionally there may be more than one gas outlet 60, for example one or more outlets in each cell 42 or multiple outlets all in one cell 42 or a subset of the cells 42. Interior walls 54 do not extend to the lids 30 and so ammonia rich gas can be withdrawn from all of the cells 42 through one or more outlets 60 in one cell 42. In the example shown, there is no inlet for sweeping air, but there may be some mild leakage around seals between the lids 30 and the tank 40. The ammonia gas flows through the tank 40 to gas outlet 60 in a direction opposite to the flow of liquid through the tank 40. This helps ensure that ammonia rich gas does not mix with the low ammonia concentration liquid in the last cell 42.

As discussed above, an ammonia stripper has a tank, with an aerator and a heat exchanger tube inside of the tank. The tank also defines a headspace. An outlet in communication with the headspace allows ammonia rich gas to be removed from the headspace. The tank may be rectangular. Whether rectangular or not, the tank may be divided into stages, alternatively called cells, by one or more internal dividers. To strip ammonia from water, the water is added to the tank. Air bubbles are produced in the water. A heating medium flows though the tube. Gas containing ammonia is produced in the headspace and withdrawn from the headspace.

We claim:
1. An ammonia stripper comprising,
 a) a tank having internal dividers that create a plurality of cells within the tank;
 wherein within each of the plurality of cells is located:
 b) an aerator; and,
 c) heat exchanger tubing;
 wherein the aerator and heat exchanger tubing of each cell are attached to a frame inside the cell wherein the aerator, heat exchanger tubing and frame are parts of a cassette that is removable from the tank.

2. The ammonia stripper of claim 1 wherein the tank defines a headspace and further comprising an outlet in communication with the headspace.

3. The ammonia stripper of claim 2 wherein the tank is rectangular.

4. The ammonia stripper of claim 1 wherein the tank that is rectangular and has the dimensions of an ISO shipping container.

5. A process for stripping ammonia from water comprising steps of,
   a) providing an ammonia stripper according to claim 1;
   b) adding water produced from dewatering sludge to the tank such that the heat exchanger tubing is immersed;
   c) producing air bubbles in the water from the aerator;
   d) flowing a heating medium through the heat exchanger tube;
   e) withdrawing a gas containing ammonia from the headspace of the tank.

6. The ammonia stripper of claim 1 wherein the cassette includes a lid covering at least part of a cell in which the cassette is located, the lid attached to the frame such that the frame is suspended from the lid.

7. The ammonia stripper of claim 6, wherein the cassette includes a set of latches that secure the lid to at least one of a wall of the tank and an internal divider.

8. The ammonia stripper of claim 1 having a length of heat exchanger tubing that is greater than the perimeter of the tank.

9. The ammonia stripper of claim 1 having a plurality of aerators dispersed across the bottom of the tank.

10. The ammonia stripper of claim 1 having, in each of the plurality of cells, a plurality of aerators extending from a manifold attached to the frame.

* * * * *